Nov. 24, 1964   M. P. LEBOURG   3,158,428
MULTICHANNEL RECORDER
Filed Nov. 28, 1962
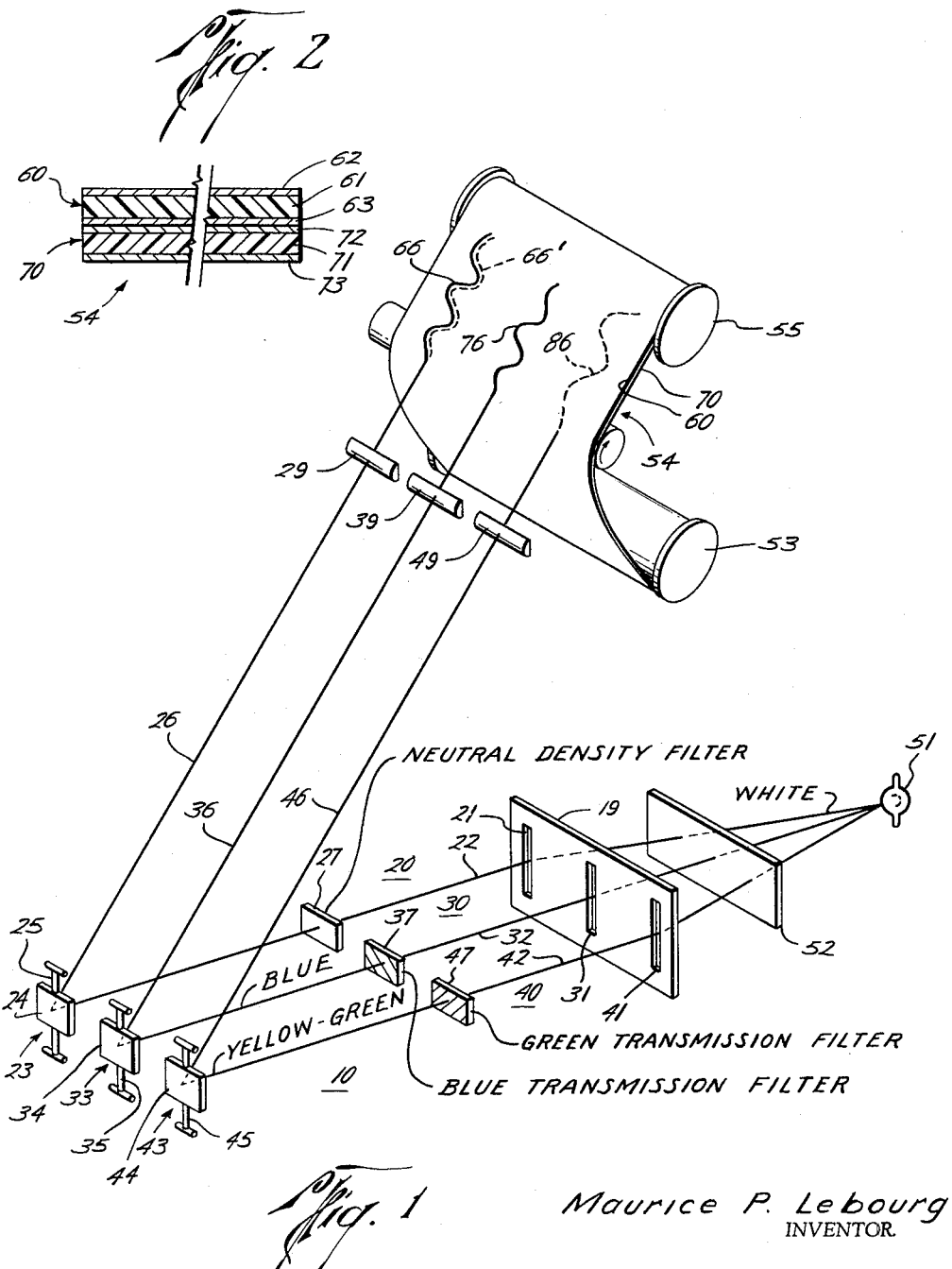
Maurice P. Lebourg
INVENTOR.
BY Michael P. Breston
ATTORNEY

3,158,428
MULTICHANNEL RECORDER
Maurice P. Lebourg, Houston, Tex., assignor to Schlumberger Well Surveying Corporation, Houston, Tex., a corporation of Texas
Filed Nov. 28, 1962, Ser. No. 240,657
3 Claims. (Cl. 346—46)

This invention relates to recorders and more particularly to galvanometric recorders in which intelligence information processed in a plurality of channels is recorded on two or more information storage media.

Each intelligence processing channel in a typical galvanometric recorded includes a D'Arsonval moving-coil galvanometer or the like having a movable light-reflecting surface whose displacements correspond to the electric current flowing through the galvanometer's coil and hence to the monitored physical quantity, such as the earth's resistivity, the temperature and pressure of the liquid in a borehole, the travel time of sonic waves, the induced or natural radiation intensity level, etc. An intelligence channel further includes an "object," a light source for impinging an object-light beam on the reflecting surface, and a film or the like exposed to the reflected image-light beam. Frequently, it is advantageous to record simultaneously or selectively the position of the image beam on two or more films.

Accordingly, it is an object of the invention to provide new and improved optical records of the foregoing character wherein a light beam from a single object may be recorded simultaneously on at least two films or selectively on either of the films.

This and other apparent objects of the invention are accomplished in galvanometers on the foregoing character by projecting the objects' reflected image beams on two juxtaposed films, the first film being responsive only to a first portion of the light spectrum (first color) and the second film to a separate, second portion of the spectrum (second color), thereby allowing an image beam including the first and second colors to become recorded simultaneously on both films, a first color beam to become recorded on the first film and a second color beam to become recorded on the second film.

This invention will be better understood by consideration of the accompanying drawings in which:

FIGURE 1 is a diagrammatic showing of a preferred recorder arranged in accordance with the teachings of this invention; and FIGURE 2 is a view in cross section of the sandwich film arrangement of FIGURE 1.

The appended drawing is intentionally diagrammatic for the sake of clarity and simplicity of exposition and to avoid the showing of parts well-known in the art.

Referring to the drawings, a typical recorder, generally designated as 10, may include a plurality of recording channels. For simplicity only three channels 20, 30, and 40 are shown. In practice, more than three channels—typically nine-to-fifteen channels—are employed. In the drawing, like parts in the three channels are similarly numbered: the first digit of a number designates the channel and the second digit a particular part. To avoid repetitiousness, only the description of the first part in a group is given.

Each channel includes a well-defined light-emitting object. The object in channel 20, for example, is a vertical slit 21 formed in an opaque plate 19. The objects in channels 30, 40 are slits 31, 41, respectively. The source of light illuminating objects 21, 31, 41 (21–41) may be of any suitable type. However, for the sake of efficiency, it is preferred to employ a mercury vapor lamp 51: its output light is limited essentially to the blue-green-yellow portion of the spectrum. The beams of light passing through slits 21, 31, and 41 are herein respectively called the "object beams" 22, 32, and 42. As previously mentioned, channels 20–40 may respectively include galvanometers 23–43 preferably of the D'Arsonval type. A galvanometer such as 23 has a reflecting plane mirror 24 mounted on a movable member, such as a torsion shaft 25. No further description of D'Arsonval galvanometers is believed necessary: their operation and construction are well-known in the art.

A suitable collector lens system 52, preferably positioned adjacent to and in rear of plate 19, makes object beam 22 converge on the surface of reflecting mirror 24 which is positioned at the focal point of lens 52. After being reflected by mirror 24, object beam 22 becomes an image beam 26. It will be apparent that image beam 26 has the same color as object beam 22. Although not including all the component colors of ordinary light, the color of beam 22 is herein called "white." To achieve selective recording of an object beam, one or more of its component colors are removed. The removal of a component of light from a white beam makes it a "colored" beam. Coloring is readily achieved by passing either the object or its image beam through a suitable color-absorbing filter.

For example in channel 30, object beam 32 is passed through a blue transmission filter 37, the output light of which is essentially blue. In channel 40, object beam 42 is passed through a green transmission filter 47, the output light of which falls in the yellow-to-green portion of the spectrum. To attenuate the uncolored object beam 22 by an amount nearly equal to the attenuation imposed on the object beams 32, 42 by filters 37, 47, respectively, a neutral density filter 27 is inserted in the path of beam 22. To achieve near point images of slit objects 21–41, cylindrical lenses 29–49 are suitably positioned in the paths of image beams 26–46.

The near point images of slit objects 21–41 are either simultaneously or selectively recorded on at least two storage media, such as color films 60 and 70, wound together on a supply spool 53 to form a "sandwich film" 54. Driving means, not shown, are coupled to a driving spool 55 for displacing the sandwich film 54.

If the displacement of the sandwich film 54 is a known function of a given variable, such as time, depth, etc., then obviously the amplitudes of the monitored conditions responsible for the rotations of mirrors 24–44 will be displayed on films 60, 70 in Cartesian coordinates as functions of such a variable.

With the color filters positioned as shown, galvanometer 23 records on both films 60 and 70; galvanometer 33 records only on the upper film 60; and galvanometer 43 records only on the bottom film 70. Traces 66, 76 on film 60, corresponding respectively to image beams 26, 36, are shown in solid lines; whereas, traces 66' and 86 on film 70, corresponding respectively to image beams 26, 46, are shown in dotted lines.

As shown in more detail in FIGURE 2, the sandwich film 54 is formed by placing on top of each other the two color films 60, 70 having transparent bases 61, 71, respectively. The top surface of base 61 carries an emulsion 62 which is sensitive to blue light only and the bottom surface an orange-colored antihalation backing 63 which is practically opaque to blue light. On the top surface of base 71 is an orthochromatic, blue-through-green-sensitive emulsion 72 and on the bottom surface may be an antihalation backing 73. Thus the combination of the antihalation backing 63 and the orthochromatic emulsion 72 makes the second film 70 exposable only by yellow and green light (white light less the blue component).

Various types of color films may be employed provided their combination yields a first surface exposable by blue color, a second surface exposable by yellow-green color, and a third surface sandwiched between the first and the second surfaces which absorbs blue and is transparent to yellow-green. In one embodiment, applicant used for film 60 Eastman Linagraph Survey Film, Type SO-143 and for film 70 Eastman Linagraph Recording Film, Type SO-171.

To summarize the operation of a typical channel such as 20 of recorder 10, light source 51 allows an object beam 22 to pass through slit 21 of opaque plate 19. Torsion shaft 25 and hence reflected image beam 26 become displaced as a function of the monitored condition which controls the current passing through the coil of galvanometer 23. The blue portion of the white beam 26 exposes emulsion 62, passes through base 61, and then becomes absorbed by backing 63. However, the remaining portion (yellow-green) of beam 26 passes through emulsion 62, base 61, backing 63 and exposes the orthochromatic emulsion 72. Thus, the white beam 26 yields traces 66, 66' on films 60, 70, respectively.

The recording in channel 30 is similarly accomplished except that now the essentially blue beam 36 can only expose emulsion 62 and not emulsion 72: the backing 63 stops blue light from reaching emulsion 72. Consequently, beam 36 can form only a single trace 76.

Finally in channel 40, the green transmission filter 47 allows only light rays falling within the yellow-green portion of the spectrum to reach sandwich film 54. Since antihalation backing 63 is transparent to that portion, the light rays expose emulsion 72 to yield trace 86 on film 70.

To achieve an efficient light-transmitting system, emulsion 62 should be as transparent as possible, and the sensitivity of emulsion 72 should be greater than the sensitivity of emulsion 62 by an amount sufficient to offset the yellow-green light lost during the passage through film 60. Also, because in practice it is difficult to match color filters for light transmission efficiency, some balancing, by means of neutral density filters other than filter 27 is recommended if similar intensity traces on films 60, 70 are desired.

It will also be apparent that although in the above-described recorder the color filters 37, 47 are assumed stationary or static, in practice it may be desired to "code" the traces, i.e., to periodically interrupt the recordings thereof. This can be accomplished in channel 30 by periodically inserting a green transmission filter either in beam 32 or in beam 36, and in channel 40 by periodically inserting a blue transmission filter either in beam 42 or in beam 46.

Obviously, the choice of colors, filters, lenses, galvanometers, etc., is not limited to those illustrated in the exemplary embodiment of the invention. Accordingly, the accompanying claims are intended to include all equivalent arrangements falling within the scope of the invention.

What is claimed is:

1. In a recorder for monitoring the values of metered conditions,
a recording member,
means projecting a beam of light including at least a first and a second color;
said recording member including a distinct first film defining a first light-sensitive surface susceptible of becoming exposed by said first color,
a distinct second film defining a second light-sensitive surface susceptible of becoming exposed by said second color, and
a third surface sandwiched between said first and said second surfaces for absorbing light of said first color, said first and said second films being displaced under normal operating conditions continuously at a predetermined speed;
means positioned in the path of said beam to reflect the beam onto said first surface by an angle dependent on the value of a metered condition, and
means positioned in the path of said beam to selectively absorb light either of said first color or of said second color thereby allowing the beam to become respectively recorded either on said second surface or on said first surface.

2. In a recorder for monitoring the values of metered conditions,
at least a first recording channel,
a second recording channel, and
a third recording channel;
a recording member common to all channels,
said first channel including means projecting on said member a beam of light of a first distinct color,
said second channel including means projecting on said member a beam of light of a second distinct color, and
said third channel including means projecting on said member a beam of light comprising said first and said second colors;
said recording member including a distinct first film defining a first light-sensitive surface susceptible of becoming exposed by said first color,
a distinct second film defining a second light-sensitive surface susceptible of becoming exposed by said second color, and
a third surface sandwiched between said first and said second surfaces for absorbing light of said first color whereby the beam of light in said first channel becomes recorded on said first surface only,
the beam of light in said second channel becomes recorded on said second surface only, and
the beam of light in said third channel becomes recorded simultaneously on said first and second surfaces.

3. In a recorder for monitoring the values of metered conditions,
a first recording channel,
a second recording channel, and
a third recording channel;
a recording member,
said first channel including means projecting a beam of light of a first distinct color,
said second channel including means projecting a beam of light of a second distinct color, and
said third channel including means projecting a beam of light comprising said first and said second colors;
said recording member including a distinct first film defining a first light-sensitive surface susceptible of becoming exposed by said first color,
a distinct second film defining a second light-sensitive surface susceptible of becoming exposed by said second color, and
a third surface sandwiched between said first and said second surfaces for absorbing light of said first color, said first and second films being displaced under normal operating conditions continuously at a predetermined speed;

means positioned in the path of each beam to reflect the beam until said recording member by an angle dependent on the value of a metered condition whereby the beam in said first channel becomes recorded on said first surface only, the beam in said second channel becomes recorded on said second surface only, and the beam in said third channel becomes recorded simultaneously on said first and said second surfaces.

References Cited in the file of this patent

UNITED STATES PATENTS

| | | |
|---|---|---|
| 2,000,058 | Ball | May 7, 1935 |
| 2,615,778 | Butz | Oct. 28, 1952 |
| 2,937,915 | Peterson | May 24, 1960 |
| 2,944,620 | Van Dijck | July 12, 1960 |
| 3,011,856 | Palmer et al. | Dec. 5, 1961 |
| 3,057,275 | Walkup et al. | Oct. 9, 1962 |
| 3,072,907 | Boucher | Jan. 8, 1963 |